United States Patent
Singh et al.

(10) Patent No.: US 11,425,028 B2
(45) Date of Patent: Aug. 23, 2022

(54) PRIORITY BASED AUTOMATED NETWORK SELECTION FOR MICRO-SERVICES IN SERVICE MESH

(71) Applicant: CISCO TECHNOLOGY, INC., San Jose, CA (US)

(72) Inventors: Akshya Kumar Singh, Fremont, CA (US); Sri Sairam Goli, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/916,688

(22) Filed: Jun. 30, 2020

(65) Prior Publication Data

US 2021/0336872 A1    Oct. 28, 2021

Related U.S. Application Data

(60) Provisional application No. 63/016,793, filed on Apr. 28, 2020.

(51) Int. Cl.
| | |
|---|---|
| *H04L 12/751* | (2013.01) |
| *H04L 45/00* | (2022.01) |
| *H04L 47/20* | (2022.01) |
| *H04L 45/02* | (2022.01) |

(52) U.S. Cl.
CPC .............. *H04L 45/22* (2013.01); *H04L 45/02* (2013.01); *H04L 45/26* (2013.01); *H04L 47/20* (2013.01)

(58) Field of Classification Search
CPC ......... H04L 45/22; H04L 45/02; H04L 45/26; H04L 47/20

USPC ......................................................... 370/217
See application file for complete search history.

(56) References Cited

U.S. PATENT DOCUMENTS

| | | | | |
|---|---|---|---|---|
| 6,970,902 | B1 * | 11/2005 | Moon | H04L 45/60 709/201 |
| 8,677,023 | B2 * | 3/2014 | Venkataraghavan | H04L 67/1097 709/200 |
| 9,237,034 | B2 * | 1/2016 | Huang | H04L 45/28 |
| 10,362,141 | B1 * | 7/2019 | Thompson | H04L 45/22 |
| 10,484,337 | B2 * | 11/2019 | Subbarayan | H04L 63/0281 |
| 10,791,168 | B1 * | 9/2020 | Dilley | H04L 41/22 |
| 10,860,390 | B2 * | 12/2020 | Sukhomlinov | G06F 9/541 |

(Continued)

OTHER PUBLICATIONS

Google Cloud, "Establishing 99.99% availability for Dedicated Interconnect," retrieved from https://cloud.google.com/network-connectivity/docs/interconnect/tutorials/dedicated-creating-9999-availability, on Apr. 4, 2022, 8 pages.

(Continued)

*Primary Examiner* — Anthony Mejia

(57) ABSTRACT

In one embodiment, a method includes mapping micro-service network interfaces in a service network to service engine network interfaces for connecting micro-services to external endpoints, transmitting a request for communication with one of the external endpoints from one of the micro-services to a service broker operable to select one of the micro-service network interfaces for the communication with the external endpoint, and receiving a response from the service broker with the selected micro-service network interface. The service broker dynamically selects a service path for the communication based on a policy and independent from default network routes.

20 Claims, 4 Drawing Sheets

(56) References Cited

U.S. PATENT DOCUMENTS

| | | | |
|---|---|---|---|
| 10,999,407 B1* | 5/2021 | Thompson | H04L 45/22 |
| 11,128,633 B2* | 9/2021 | Bhatia | H04L 63/101 |
| 2003/0105864 A1* | 6/2003 | Mulligan | H04L 67/30 709/225 |
| 2006/0069777 A1* | 3/2006 | Kato | H04L 67/327 709/225 |
| 2010/0251327 A1* | 9/2010 | Channabasavaiah | H04L 67/2809 726/1 |
| 2013/0232498 A1* | 9/2013 | Mangtani | G06F 9/5038 718/104 |
| 2014/0304402 A1* | 10/2014 | Prakash | H04L 43/0882 709/224 |
| 2016/0028616 A1* | 1/2016 | Vasseur | H04L 47/50 370/412 |
| 2017/0012870 A1* | 1/2017 | Blair | H04L 45/74 |
| 2017/0187785 A1* | 6/2017 | Johnson | H04L 67/10 |
| 2018/0004544 A1* | 1/2018 | Vasiltschenko | H04L 67/26 |
| 2018/0123941 A1* | 5/2018 | Flamini | H04L 45/302 |
| 2019/0207912 A1 | 7/2019 | Nielson | |
| 2019/0250966 A1* | 8/2019 | Chennupati | G06F 9/4856 |
| 2019/0268384 A1* | 8/2019 | Hu | H04L 63/08 |
| 2019/0268420 A1* | 8/2019 | Acharya | G06F 8/658 |
| 2019/0394286 A1* | 12/2019 | Chunduru Venkata | H04L 41/0843 |
| 2020/0050494 A1* | 2/2020 | Bartfai-Walcott | G06F 9/5083 |
| 2020/0067818 A1* | 2/2020 | Jeuk | H04L 65/1046 |
| 2020/0092366 A1* | 3/2020 | Fix | H04L 45/02 |
| 2020/0110625 A1 | 4/2020 | Warnicke | |
| 2020/0177634 A1* | 6/2020 | Hwang | H04L 63/1433 |
| 2020/0211027 A1* | 7/2020 | Sharifi | G06F 9/541 |
| 2020/0322230 A1* | 10/2020 | Natal | G06F 9/44505 |
| 2020/0365264 A1* | 11/2020 | Girardeau | G06F 3/0482 |
| 2020/0404076 A1* | 12/2020 | Mahadevan | G06F 9/5044 |
| 2020/0409797 A1* | 12/2020 | Mathew | G06F 3/065 |
| 2021/0037117 A1* | 2/2021 | Johnson | H04L 9/0897 |
| 2021/0058435 A1* | 2/2021 | Sharma | H04L 65/1073 |
| 2021/0135973 A1* | 5/2021 | Vedam | H04L 45/02 |
| 2021/0149879 A1* | 5/2021 | Kancharla | G06F 8/65 |
| 2021/0160169 A1* | 5/2021 | Shen | H04L 45/04 |
| 2021/0184977 A1* | 6/2021 | Testicioglu | H04L 47/20 |
| 2021/0342188 A1* | 11/2021 | Novakovic | H04L 63/10 |

OTHER PUBLICATIONS

Google Cloud, "Anthos technical overview," retrieved from https://cloud.google.com/anthos/docs/concepts/overview, on Apr. 4, 2022, 16 pages.

Goodison, "Google Cloud Unleashes Managed Service Mesh, Serverless for Anthos," https://www.epam.com/about/newsroom-in-the-news/2019/google-cloud-unleashes-managed-service-mesh-serverless-for-anoths, Sep. 18, 2019, 4 pages.

BSO | IX Reach, "Press Release: IX Reach supports new Google Cloud Partner Interconnect product," https://www.ixreach.com/news/hybrid-network-google-cloud-partner-interconnect/, Apr. 24, 2018, 3 pages.

* cited by examiner

PRIORITY BASED AUTOMATED NETWORK SELECTION FOR MICRO-SERVICES IN SERVICE MESH

STATEMENT OF RELATED APPLICATION

The present application claims priority from U.S. Provisional Application No. 63/016,793, entitled PRIORITY BASED AUTOMATED NETWORK SELECTION FOR MICRO-SERVICES IN SERVICE MESH, filed on Apr. 28, 2020 (Attorney Docket No. CISCP1414+). The contents of this provisional application are incorporated herein by reference in its entirety.

TECHNICAL FIELD

The present disclosure relates generally to communication networks, and more particularly, to network selection for micro-services in a service mesh.

BACKGROUND

Micro-services in a service mesh deployment use multiple networks to communicate with external endpoints. Often times, a priority based policy is needed to connect a peer for a given protocol on a specific network for security reasons.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
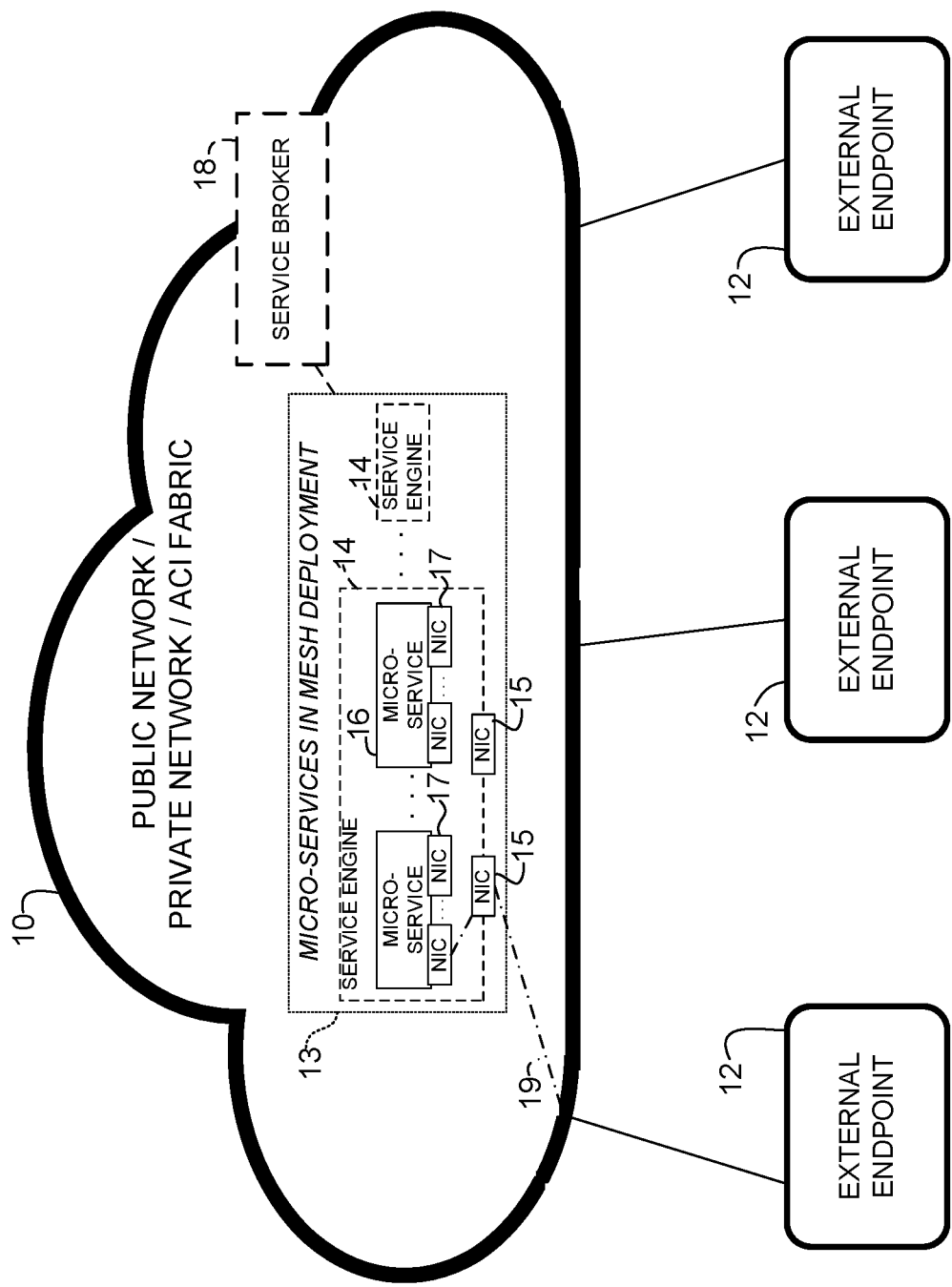
FIG. 1 illustrates an example of a network in which embodiments described herein may be implemented.

In one embodiment, a method generally comprises mapping micro-service network interfaces in a service network to service engine network interfaces for connecting micro-services to external endpoints, transmitting a request for communication with one of the external endpoints from one of the micro-services to a service broker operable to select one of the micro-service network interfaces for the communication with the external endpoint, and receiving a response from the service broker with the selected micro-service network interface. The service broker dynamically selects a service path for the communication based on a policy and independent from default network routes.

In another embodiment, an apparatus generally comprises a service broker in communication with a plurality of service engines each comprising at least one micro-service comprising multiple micro-service network interfaces mapped to host network interfaces for connecting the micro-service to external endpoints. The service broker is operable to receive a request from the micro-service for communication with one of the external endpoints, select one of the micro-service network interfaces, and respond to the micro-service with the selected micro-service network interface.

In yet another embodiment, logic is encoded on one or more non-transitory computer readable media for execution and when executed operable to map micro-service network interfaces in a service network to service engine network interfaces for connecting micro-services to external endpoints, transmit a request for communication with one of the external endpoints from one of the micro-services to a service broker operable to select one of the micro-service network interfaces for the communication with the external endpoint, and receive a response from the service broker with the selected micro-service network interface. The service broker dynamically selects a service path for the communication based on a policy and independent from default network routes.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Micro-services are common patterns for cloud based deployments and there are typically a lot of network paths needed for these micro-services to reach external endpoints such as load balancers, gateways, routers, and the like. Micro-services in a service mesh deployment use multiple networks to communicate with external endpoints. Often times, such as in the case of Kubernetes deployments, a micro-service gets one network interface and a static route is set to a default gateway that connects the micro-service to external networks. For specific types of applications, one network approach may not work and an application will need to connect to multiple external networks to implement a business function. When a micro-service has multiple interfaces, how to choose a correct network interface for its own initiated connections (out-bound) is an issue. For security reasons, a priority based policy may be needed to connect a peer for a given protocol on a specific network. Prefix based default routes are typically configured on these network nodes. In one example, prefix based routes may be pushed to the micro-service so that it can choose the right network interface to communicate with external endpoints. However, this has several limitations and does not scale well for large scale deployments. For example, it is hard to continually update routes across all micro-services, sometimes all the prefixes are not known in advance, or a default gateway policy may change based on security or other policy and applications already bound would not be updating the gateway.

The above described problem is an issue in the case of ACI (Application Centric Infrastructure) service engine deployments where a customer can onboard an APIC (Application Policy Infrastructure Controller) site that can be reachable on any of the host networks. In typical application implementations, for an outbound connection, the network interface that leads to a known route will be chosen, which is why the proper route needs to be installed within the micro-service namespace.

There is therefore, a need for an automated means to dynamically detect a correct network interface for a peer in real time that can be enforced at service level across all micro-services in a seamless and consistent manner.

The embodiments described herein implement a network service that will enable micro-services to dynamically select a network interface based on user policies in a multi-network environment. This allows a network level service graph to be built by overriding conventional static network route based criteria. As described in detail below, the embodiments allow for dynamic selection of a network within a micro-service that is reachable from a host. In one or more embodiments, if there are multiple ways to reach an APIC, a priority based policy is enforced that will be sent via in-band network (rather than an out-of-band management network).

It is to be understood that ACI and APIC as used herein are provided as examples, and the embodiments described herein may be implemented in other types of service engine deployments for use with any type of policy controllers.

Referring now to the drawings, and first to FIG. 1, a simplified example of a network in which the embodiments described herein may be implemented is shown. The network may include any number of network devices in communication via any number of nodes (e.g., routers, switches, gateways, controllers, edge devices, access devices, aggregation devices, core nodes, intermediate nodes, or other network devices), which facilitate passage of data over one or more networks. The network devices may communicate over or be in communication with one or more networks, which may include any number or arrangement of network communications devices (e.g., switches, access points, routers, or other devices) operable to route (switch, forward) data communications.

In the example shown in FIG. 1, a network 10 (e.g., public network, private network, ACI fabric, or any combination thereof) is in communication with a plurality of external endpoints 12 (three shown for simplification). The ACI fabric may include any number of components, including for example, an APIC, any number of ACI spine switches, leaf switches, or virtual switches (e.g., application virtual switch), servers, routers, virtual machines, or any other components (physical or virtual network devices) in any suitable network topology. The network may also be in communication with an administrator node comprising, for example, an APIC and the endpoint may comprise an application container. The external endpoints 12 may include, for example, load balancers, gateways, routers, hosts, edge nodes (e.g., network access devices), endpoints, or endpoint groups. In one example, the external endpoint may 12 comprise a server comprising a plurality of virtual machines and a hypervisor capable of creating the virtual machines.

In one or more embodiments, the application centric infrastructure provides centralized automation and policy-driven application profiles. The ACI network may include, for example, switches configured for ACI, a centralized policy management and application policy infrastructure controller, an application virtual switch for virtual network edges, software and hardware components, integrated physical and virtual infrastructure, network storage, and management. Within the APIC, software applications may be defined logically using constructs that are application centric, rather than network centric. The complete application definition may be located at the APIC in an application profile, which is specified based on the communication, security, and performance needs of the application. The application profile may be used to push logical topology and policy definitions down to stateless network hardware in the network fabric. As previously noted, ACI is only one example of an infrastructure in which the embodiments described herein may be implemented.

In the example shown in FIG. 1, the network 10 includes a plurality of micro-services in a mesh deployment 13. In one or more embodiments, ACI implements a set of service engines 14 to run workflows into a federated cluster with a single management plane via a policy driven framework. Each service engine 14 is configured to reach the external endpoints 12 via one or more network interfaces (NICs) (Network Interface Controllers, Network Interface Cards) 15. The NIC 15 may comprise, for example, a gigabit Ethernet adapter and may be capable of connecting a compute node to other computing devices over the network. The NICs 15 may be referred to as host level NICs and may comprise a physical NIC (PNIC) or virtual NIC (VNIC) (for a virtual service engine). There may be multiple ways for the service engine 14 to reach the external endpoints 12, and this is typically driven by conventional IP (Internet Protocol) routing. Workloads are scheduled on the service engines 14 in the form of micro-services (containers, applications) 16, each comprising multiple network interfaces (NICs) 17. For simplification, the micro-services are only shown for one of the service engines 14. As described below, each service engine 14 may include any number of micro-services 16 and each micro-service may include any number of NICs 17.

As described in detail below, a service broker 18 is in communication with a policy enforcement engine and a plurality of the service engines 14 each comprising at least one micro-service 16 comprising multiple micro-service network interfaces 17. Each of the micro-service network interfaces 17 are mapped to one of the host network interfaces 15 for connecting the micro-service to one or more of the external endpoints 12. The service broker 18 is operable to receive a request from one of the micro-services 16 for communication with one of the external endpoints 12, select one of the micro-service network interfaces 17, and respond to the micro-service with the selected micro-service network interface. The service broker 18 dynamically selects a service path (e.g., path 19 shown in FIG. 1) for the communication based on policy and independent from default network routes.

Figure 2:
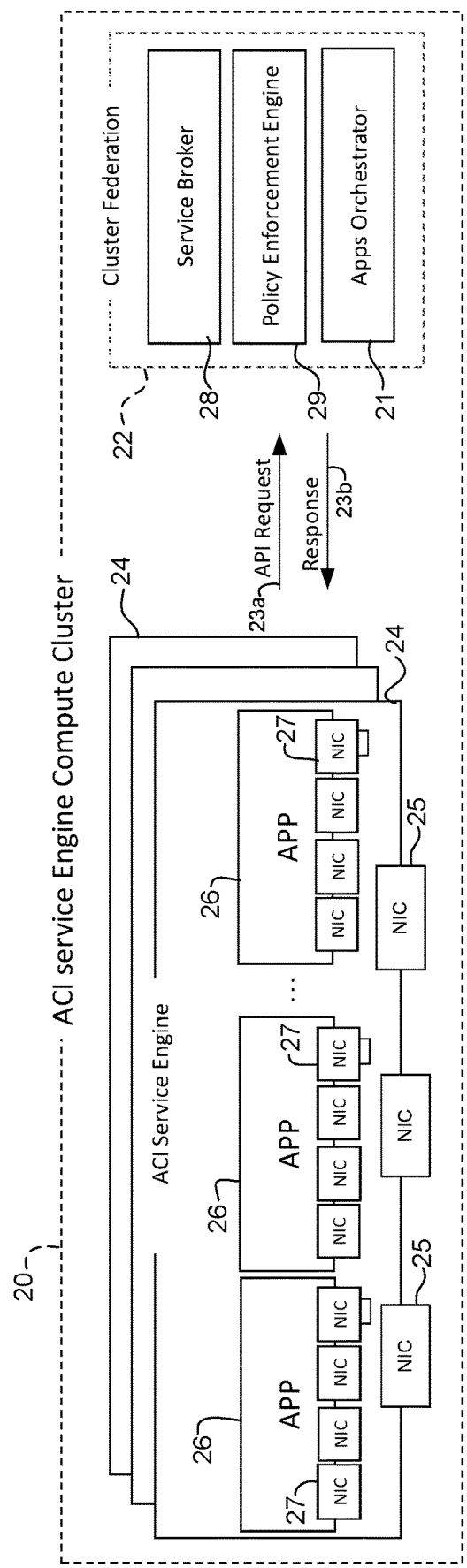
FIG. 2 illustrates an ACI (Application Centric Infrastructure) service engine compute cluster, in accordance with one embodiment.

Referring now to FIG. 2, an example of an ACI service engine compute cluster 20 is shown, in accordance with one embodiment. As previously noted, ACI is only used herein as an example and other application infrastructures or service engines may be used without departing from the scope of the embodiments. In this example, the ACI service engine compute cluster 20 includes a plurality of ACI service engines 24. Each service engine 24 comprises a plurality of applications (APPs) 24 (micro-service, application running at micro-service) with multiple network interfaces (NICs) 27. Each service engine 24 also includes a plurality of NICs 25 (e.g., host level NICs (PNIC (Physical Network Interface Card (physical network adapter)) or VNIC (Virtual Network Interface Card) in the case of virtual engines)), as described above with respect to FIG. 1. The cluster 20 may use an in-band management interface to access the management network of the ACI fabric.

The service engines 24 are in communication with a service broker 28, which may be associated with a cluster federation 22 comprising a policy enforcement engine 29 and an application orchestrator (service orchestrator) 21. As previously noted, the service broker 28 may be in communication with the policy enforcement engine for use in selecting the service path (micro-service NIC 27) based on one or more policies.

As shown in FIG. 2, the service engine 24 sends an API (Application Programming Interface) request 23a to the service broker 28 for selection of a source NIC 27 (mapped to host NIC 25) to use to communicate with one of the external endpoints 12 (FIGS. 1 and 2). The service broker 28 sends a response 23b identifying the selected NIC 27.

The service broker 28 is configured with a framework to provide priority based network selection and may be used with these priorities configured for a specific type of application, specific type of micro-service, or a specific domain of destination endpoints. Typical network route criteria based on user configured policy is dynamically overridden to select a network to communicate with external networks in a multi-network environment. The service broker 28 may detect correct network selection based on user configured policies and connect the micro-service with a source of the selected network. User criteria of network selection may be enforced globally across all micro-services dynamically.

It is to be understood that the networks and service engine cluster shown in FIGS. 1 and 2 are only examples, and the network may have a different configuration with a different number or type of components or topology, without departing from the scope of the embodiments.

Figure 3A:
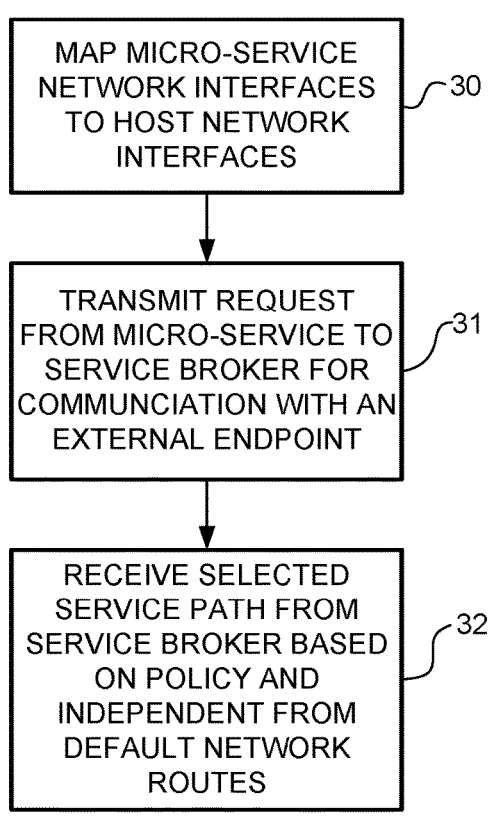
FIG. 3A is a flowchart illustrating an overview of a process for automated network path selection for micro-services, in accordance with one embodiment.

FIG. 3A is a flowchart illustrating an overview of a process for priority based automated network selection for micro-services in a service mesh, in accordance with one embodiment. Micro-service network interfaces 27 in a service network are mapped to service engine host network interfaces 25 for connecting micro-services 26 to external endpoints at step 30 (FIGS. 2 and 3A). A request 23a is transmitted from one of the micro-services 26 to the service broker 28 operable to select one of the micro-service network interfaces 27 for communication with one of the external endpoints (step 31). A response 23b from the service broker 28 with a selected micro-service network interface 27 is received (step 32). The service broker 28 dynamically selects a service path (e.g., service path 19 associated with one of the NICs 17 as shown in FIG. 1) for the communication based on policy and independent from default network routes.

Figure 3B:
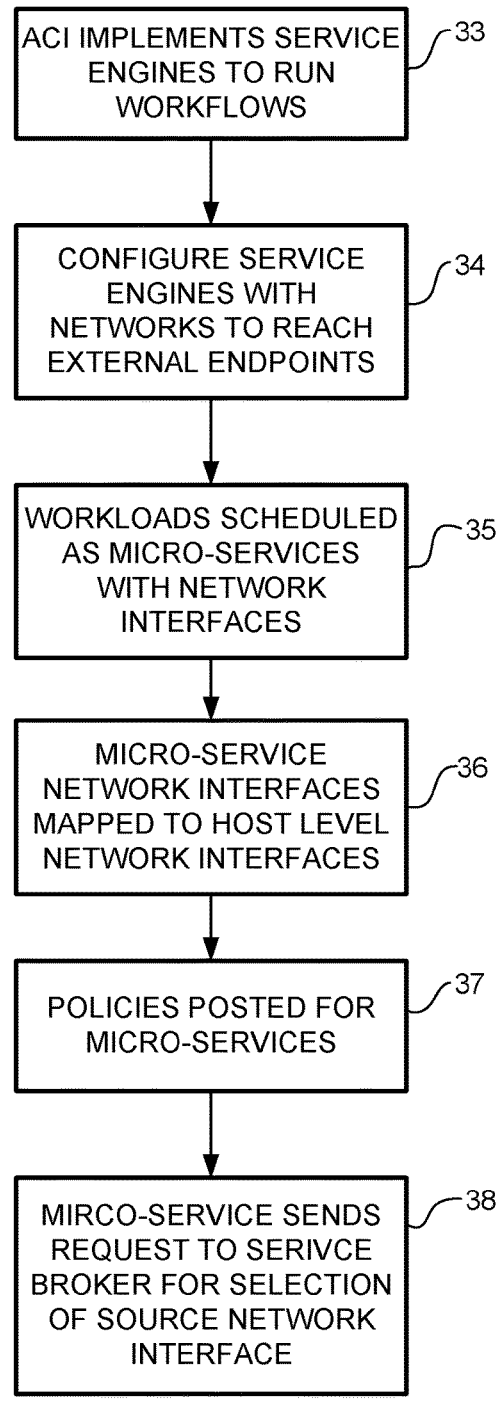
FIG. 3B is a flowchart illustrating additional details of the process shown in FIG. 3A.

FIG. 3B is a flowchart illustrating additional details of the process shown in FIG. 3A, in accordance with one embodiment. The ACI implements a set of service engines 24 to run workflows into a federated cluster with a single management plane via policy driven framework at step 33 (FIGS. 2 and 3B). Each service engine 24 is bootstrapped and configured with the correct networks to reach external endpoints (step 34). Workloads are scheduled on these service engines 24 by a service orchestrator 21 in the form of micro-services where multiple NICs 27 are inserted (step 35). These NICs within the micro-service are eventually mapped to host level NICs 25 to support reachability of micro-services to external services (step 36). For an outbound connection, which host network will be selected is a matter of which NIC within the micro-service is used to send the traffic. A user may post policies for these micro-services to pick a correct internal NIC for a given external destination based on specific match criteria or system condition (step 37). When the micro-service wants to communicate to an external service (non-cluster local, external endpoint does not fall into one of its connected subnets), it sends an API request to the service broker for selection of a source NIC to use (step 38). As previously described, the service broker responds with the selected NIC associated with a service path. The micro-service is not aware of any routing. The service broker dictates service path via policy rather than usual IP routing decision.

It is to be understood that the flowcharts shown in FIGS. 3A and 3B are only examples and steps may be added, modified, removed, combined, or rearranged, without departing from the scope of the embodiments.

Figure 4:
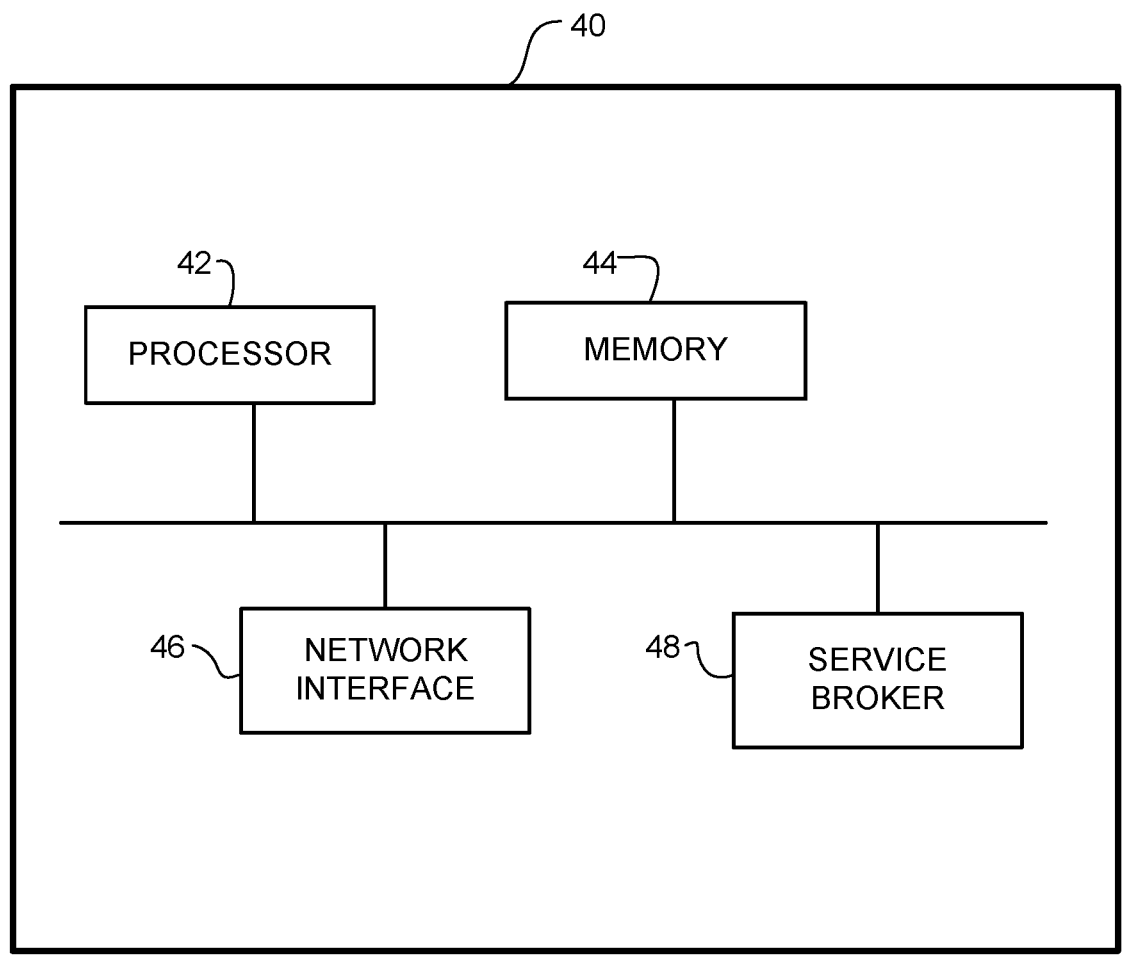
FIG. 4 is a block diagram depicting an example of a network device in which the embodiments described herein may be implemented.

FIG. 4 illustrates an example of a network device 40 that may implement the embodiments described herein. In one embodiment, the network device 40 is a programmable machine that may be implemented in hardware, software, or any combination thereof. The network device 40 includes one or more processor 42, memory 44, network interface 46, and service broker 48 (e.g., code, software, logic, module, device).

Memory 44 may be a volatile memory or non-volatile storage, which stores various applications, operating systems, modules, and data for execution and use by the processor. The network device 40 may include any number of memory components.

Logic may be encoded in one or more tangible media for execution by the processor 42. For example, the processor 42 may execute codes stored in a computer-readable medium such as memory 44. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 40 may include any number of processors 42.

The network interface 46 may comprise any number of interfaces (line cards, ports, NICs) for receiving data or transmitting data to other devices.

It is to be understood that the network device 40 and topology shown and described above and the embodiments described herein may be implemented in networks comprising different network topologies or a different number, type, or arrangement of network devices, without departing from the scope of the embodiments. For example, the network may comprise any number or type of network communications devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing.

Although the apparatus and method have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
mapping micro-service network interface cards in a service network to service engine network interface cards for connecting micro-services to external endpoints;
transmitting a request for communication with one of the external endpoints from one of said micro-services to a service broker operable to select one of said micro-service network interface cards for said communication with the external endpoint; and
receiving a response from the service broker with a selected micro-service network interface card;
wherein the service broker dynamically selects a service path for said communication based on a policy and independent from default network routes.

2. The method of claim 1 wherein said micro-services operate at service engines in a service engine cluster with a single management plane and policy driven framework.

3. The method of claim 2 wherein the service engines operate in an Application Centric Infrastructure.

4. The method of claim 2 wherein the service engines are in communication with an application policy infrastructure controller.

5. The method of claim 1 wherein transmitting said request comprises transmitting a request to a federated cluster comprising the service broker and a policy enforcement engine.

6. The method of claim 1 wherein the service broker is in communication with a policy enforcement engine.

7. The method of claim 1 wherein the service broker is located in a cluster federation comprising a service orchestrator operable to schedule said micro-services on a plurality of service engines.

8. The method of claim 1 wherein said policy is based on one or more of a type of said micro-service, a type of application running at said micro-service, or a domain of the external endpoint.

9. The method of claim 1 wherein said policy comprises a user configured policy.

10. An apparatus comprising:
a service broker in communication with a plurality of service engines each comprising at least one micro-service comprising multiple micro-service network interface cards mapped to host network interface cards for connecting said micro-service to external endpoints;
wherein the service broker is operable to receive a request from said micro-service for communication with one of the external endpoints, select one of said micro-service network interface cards, and respond to said micro-service with a selected micro-service network interface card.

11. The apparatus of claim 10 wherein the service engines operate in a service engine cluster with a single management plane.

12. The apparatus of claim 10 wherein the service engines operate in an Application Centric Infrastructure.

13. The apparatus of claim 10 wherein the service broker is located in a cluster federation comprising a service orchestrator operable to schedule said micro-services on the service engines.

14. The apparatus of claim 10 wherein the service broker is in communication with a policy enforcement engine and wherein the service broker dynamically selects a service path for said communication based on a policy and independent from default network routes.

15. The apparatus of claim 14 wherein said policy is based on one or more of a type of said micro-service, a type of application running at said micro-service, or a domain of the external endpoint.

16. The apparatus of claim 14 wherein said policy comprises a user configured policy.

17. Logic encoded on one or more non-transitory computer readable media for execution and when executed operable to:
map micro-service network interface cards in a service network to service engine network interface cards for connecting micro-services to external endpoints;
transmit a request for communication with one of the external endpoints from one of said micro-services to a service broker operable to select one of said micro-service network interface cards for said communication with the external endpoint; and
receive a response from the service broker with a selected micro-service network interface card;
wherein the service broker dynamically selects a service path for said communication based on a policy and independent from default network routes.

18. The logic of claim 17 wherein said request is transmitted to a federated cluster comprising the service broker and a policy enforcement engine.

19. The logic of claim 17 wherein said policy is based on one or more of a type of said micro-service, a type of application running at said micro-service, or a domain of the external endpoint.

20. The logic of claim 17 wherein said policy comprises a user configured policy.

* * * * *